United States Patent
Alperovich et al.

[11] Patent Number: 6,138,014
[45] Date of Patent: Oct. 24, 2000

[54] SYSTEM AND METHOD FOR OPTIMIZATION OF MULTI-PARTY CALLS IN A SATELLITE NETWORK

[75] Inventors: Vladimir Alperovich, Dallas; Eric Valentine, Plano, both of Tex.

[73] Assignee: Ericsson Inc., Research Triangle Park, N.C.

[21] Appl. No.: 09/031,624

[22] Filed: Feb. 27, 1998

[51] Int. Cl.⁷ .............................. H04Q 7/20; H04B 7/185
[52] U.S. Cl. .......................................... 455/428; 455/12.1
[58] Field of Search ................................. 455/12.1, 13.1, 455/426, 432, 427, 430, 507, 508, 509, 428, 435, 445; 370/316, 351

[56] References Cited

U.S. PATENT DOCUMENTS

| | | | |
|---|---|---|---|
| 5,509,004 | 4/1996 | Bishop, Jr. et al. | 370/325 |
| 5,526,400 | 6/1996 | Nguyen | 455/432 |
| 5,832,382 | 11/1998 | Alperovich | 455/433 |
| 5,862,480 | 1/1999 | Wild et al. | 455/432 |
| 5,915,217 | 6/1999 | Wiedeman et al. | 455/427 |
| 5,963,864 | 10/1999 | O'Neil et al. | 455/445 |
| 5,966,658 | 10/1999 | Kennedy, III et al. | 455/426 |
| 6,038,304 | 3/2000 | Hart | 379/202 |

FOREIGN PATENT DOCUMENTS

| | | | |
|---|---|---|---|
| 97/46036 | 12/1997 | WIPO | H04Q 7/22 |

*Primary Examiner*—Nguyen Vo
*Assistant Examiner*—Charles N Appiah
*Attorney, Agent, or Firm*—Jenkins & Gilchrist, P.C.

[57] ABSTRACT

A telecommunications system and method is disclosed for optimizing multi-party calls within a satellite network. This can be accomplished by the Mobile Switching Center (MSC) that the subscriber is currently registered in receiving a multi-party request from the subscriber and determining the most optimal MSC for the given multi-party call. The subscriber can then be re-registered in the most optimal MSC, and either the subscriber or the optimal MSC can set up the entire multi-party call. Alternatively, the subscriber can be re-registered in the optimal MSC, which then sets up the call to the first party of the multi-party call. Thereafter, the subscriber can set up the rest of the multi-party call.

40 Claims, 5 Drawing Sheets

SYSTEM AND METHOD FOR OPTIMIZATION OF MULTI-PARTY CALLS IN A SATELLITE NETWORK

BACKGROUND OF THE PRESENT INVENTION

1. Field of the Invention

The present invention relates generally to telecommunications systems and methods for call management within a satellite network, and specifically for determining the optimal mobile switching center for handling multi-party calls.

2. Background and Objects of the Present Invention

Cellular telecommunications is one of the fastest growing and most demanding telecommunications applications ever. Today it represents a large and continuously increasing percentage of all new telephone subscriptions around the world. A standardization group, European Telecommunications Standards Institute (ETSI), was established in 1982 to formulate the specifications for the Global System for Mobile Communication (GSM) digital mobile cellular radio system in use today, and described in more detail herein.

With reference now to FIG. 1 of the drawings, there is illustrated a GSM Public Land Mobile Network (PLMN), such as cellular network 10, which in turn is composed of a plurality of areas 12, each with a Mobile Services Center (MSC) 14 and an integrated Visitor Location Register (VLR) 16 therein. The MSC/VLR areas 12, in turn, include a plurality of Location Areas (LA) 18, which are defined as that part of a given MSC/VLR area 12 in which a mobile station (MS) 20 may move freely without having to send update location information to the MSC/VLR area 12 that controls the LA 18. Each Location Area 12 is divided into a number of cells 22. Mobile Station (MS) 20 is the physical equipment, e.g., a car phone or other portable phone, used by mobile subscribers to communicate with the cellular network 10, each other, and users outside the subscribed network, both wireline and wireless.

The MSC 14 is in communication with at least one Base Station Controller (BSC) 23, which, in turn, is in contact with at least one Base Transceiver Station (BTS) 24. The BTS is the physical equipment, illustrated for simplicity as a radio tower, that provides radio coverage to the geographical part of the cell 22 for which it is responsible. It should be understood that the BSC 23 may be connected to several base transceiver stations 24, and may be implemented as a stand-alone node or integrated with the MSC 14. In either event, the BSC 23 and BTS 24 components, as a whole, are generally referred to as a Base Station System (BSS) 25.

With further reference to FIG. 1, the PLMN Service Area or cellular network 10 includes a Home Location Register (HLR) 26, which is a database maintaining all subscriber information, e.g., user profiles, current location information, International Mobile Subscriber Identity (IMSI) numbers, and other administrative information. The HLR 26 may be co-located with a given MSC 14, integrated with the MSC 14, or alternatively can service multiple MSCs 14, the latter of which is illustrated in FIG. 1.

The VLR 16 is a database containing information about all of the Mobile Stations 20 currently located within the MSC/VLR area 12. If a MS 20 roams into a new MSC/VLR area 12, the VLR 16 connected to that MSC 14 will request data about that Mobile Station 20 from the HLR database 26 (simultaneously informing the HLR 26 about the current location of the MS 20). Accordingly, if the user of the MS 20 then wants to make a call, the local VLR 16 will have the requisite identification information without having to reinterrogate the HLR 26. In the aforedescribed manner, the VLR and HLR databases 16 and 26, respectively, contain various subscriber information associated with a given MS 20.

It should be understood that the aforementioned system 10, illustrated in FIG. 1, is a terrestrially-based system. In addition to the terrestrially-based systems, there are a number of satellite systems, which work together with the terrestrially-based systems to provide cellular telecommunications to a wider network of subscribers. This is due to the fact that the high altitude of the satellite makes the satellite visible (from a radio perspective) from a wider area on the earth. The higher the satellite, the larger the area that the satellite can communicate with.

Within a satellite-based network 205, as shown in FIG. 2 of the drawings, a system of geostationary satellites 200 in orbit are used to provide communication between Mobile Stations (MS) 210 and a satellite-adapted Base Station System (SBSS) 220, which is connected to an integrated Mobile Switching Center/Visitor Location Register (MSC/VLR) 240. The MS 210 communicates via one of the satellites 200 using a radio air interface, for instance, based on the Time Division Multiple Access (TDMA) or Code Division Multiple Access (CDMA). The satellite 200 in turn communicates with one or more SBSSs 220, which consist of equipment for communicating with the satellites 200 and through the satellites 200 to the Mobile Stations 210. The antennae and satellite tracking part of the system is the Radio Frequency Terminal (RFT) subsystem 230, which also provides for the connection of the communication path to the satellite 200.

In such satellite networks 205 using geostationary satellites 200, the coverage area for a satellite 200 can be (and usually is) very large. This area can be served by a number of MSC/VLRs 240 which are connected to Public Switched Telephone Networks (PSTNs) (wireline networks), PLMNs (cellular networks) and each other. The terrestrial interconnections (trunk circuits) to these MSC/VLRs 240 are expensive to install and maintain, especially in comparison to handling the traffic over the satellite 200. Since the distances within the area served by the satellite(s) 200 are typically very large, the costs for these circuits can be enormous. In particular, the costs can be considerable if the circuits must cross remote areas or oceans.

Therefore, calls within a geostationary satellite network can be optimized so that a subscriber is reallocated to the MSC/VLR which is the most optimal for a given call, for example, the closest MSC/VLR to the PSTN of the called party. The optimal MSC/VLR can be located in any country within the geostationary satellite network. However, if the subscriber requests a setup of a multi-party call, all the terminating legs of the multi-party call will originate from the optimal MSC, which can result in a less than optimal utilization of the resources.

It is therefore an object of the invention to optimize multi-party calls such that the optimal mobile switching center within a satellite network handles the multi-party call.

SUMMARY OF THE INVENTION

The present invention is directed to telecommunications systems and methods for optimizing multi-party calls within a satellite network. This can be accomplished by the MSC that the subscriber is currently registered in receiving a multi-party request from the subscriber and determining the most optimal MSC for the given multi-party call. In a first embodiment, the subscriber can then be re-registered in the optimal MSC, which can then set up the entire multi-party call. In a second embodiment, the subscriber can be re-registered in the optimal MSC, which can then set up the call to the first party of the multi-party call. Thereafter, the subscriber must set up the rest of the multi-party call. In a third embodiment, once the multi-party call has been set up by the subscriber, the optimal MSC for the first number dialed can inform the subscriber that the call can be optimized. At the subscribers request, the existing multi-party call can then be dropped, and the subscriber moved to the most optimal MSC, which then re-establishes the multi-party call. In a final embodiment, a new subscriber procedure can be used to request the most optimal dialing order. For this procedure, the optimal MSC returns the number which should be dialed first. The subscriber then uses this information to set up the multi-party call.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
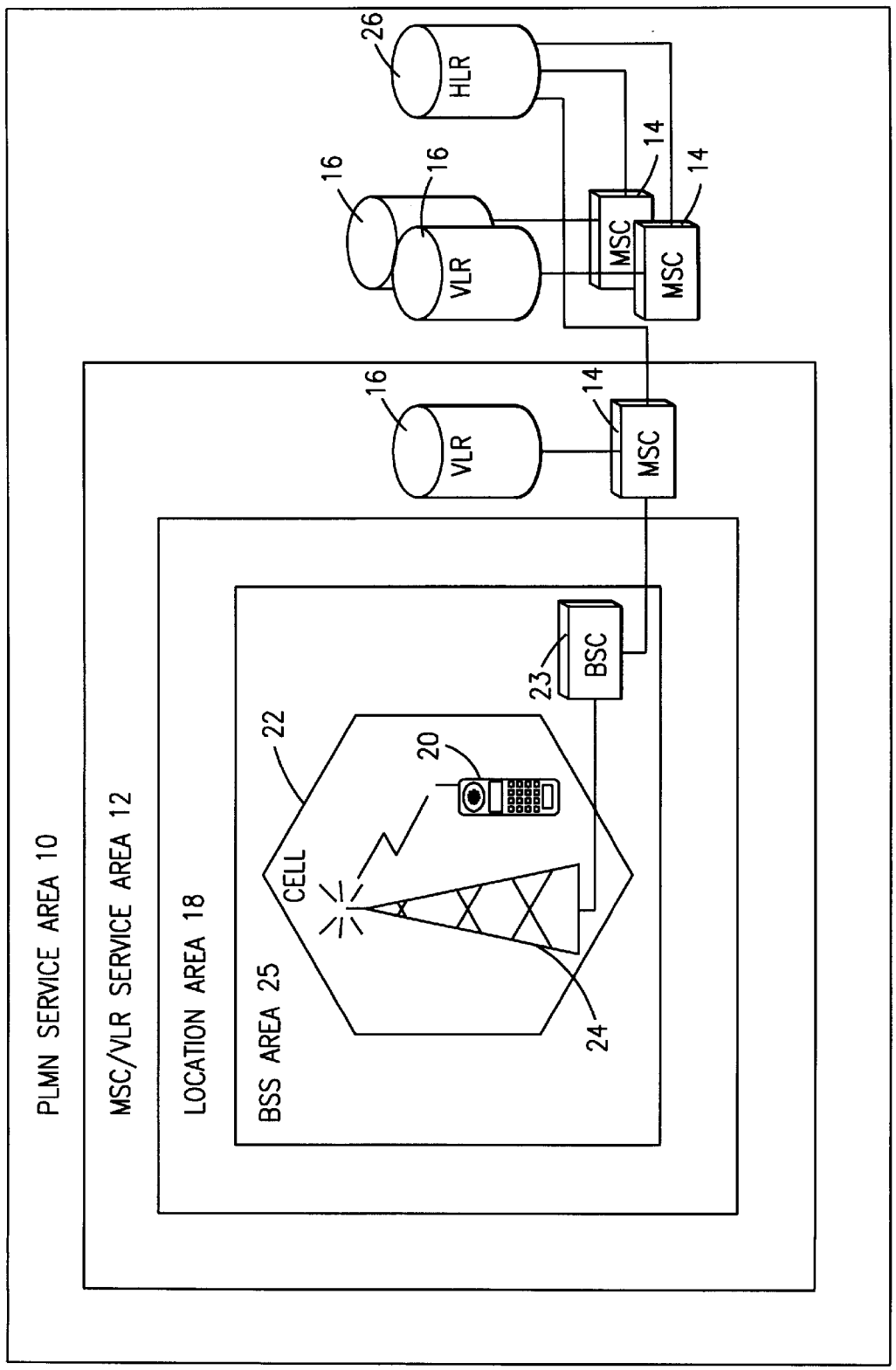
FIG. 1 is a block diagram of a conventional terrestrially-based wireless telecommunications system.
Figure 2:
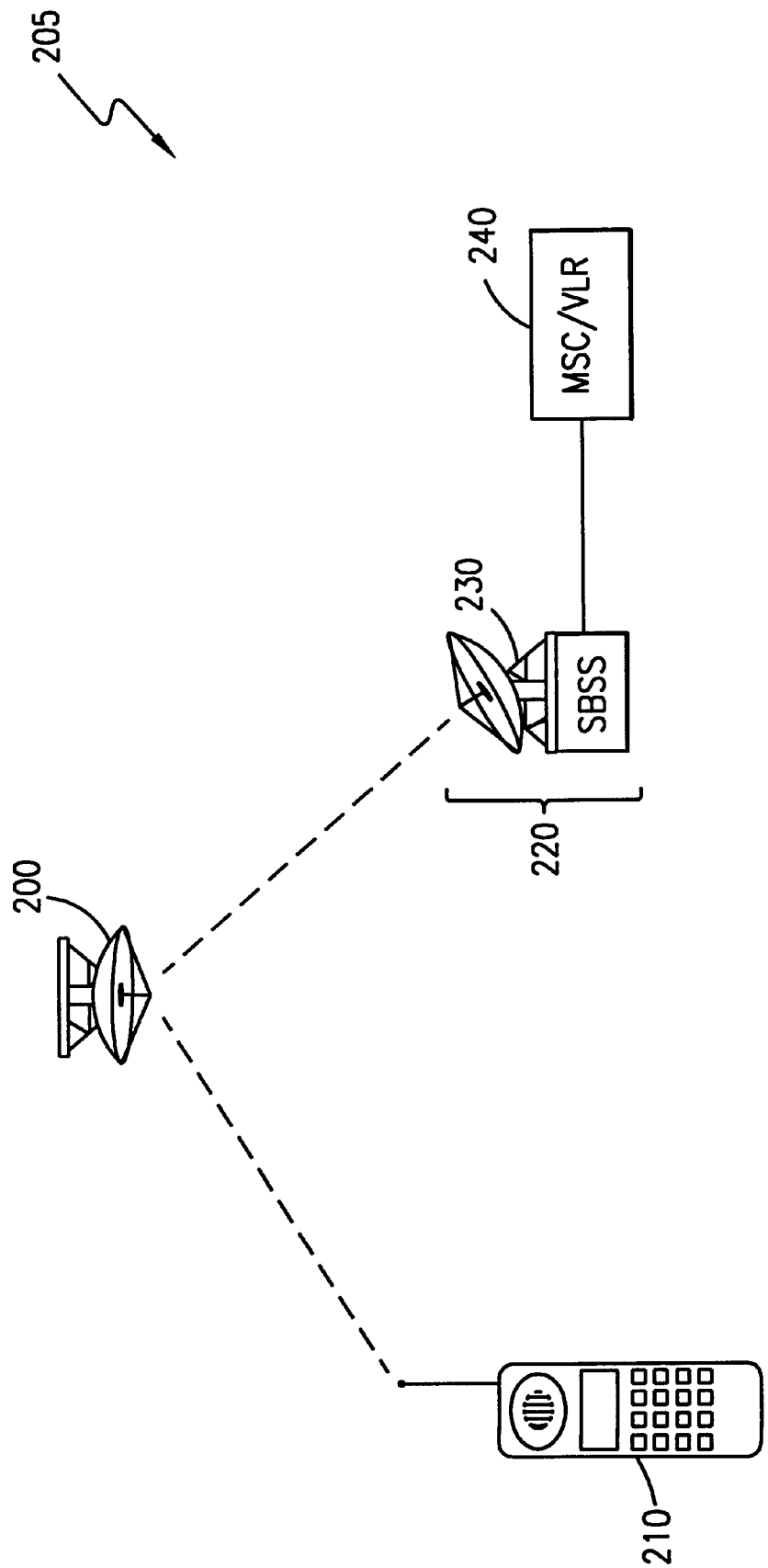
FIG. 2 is a block diagram illustrating aspects of a sample satellite-based network.
Figure 3:
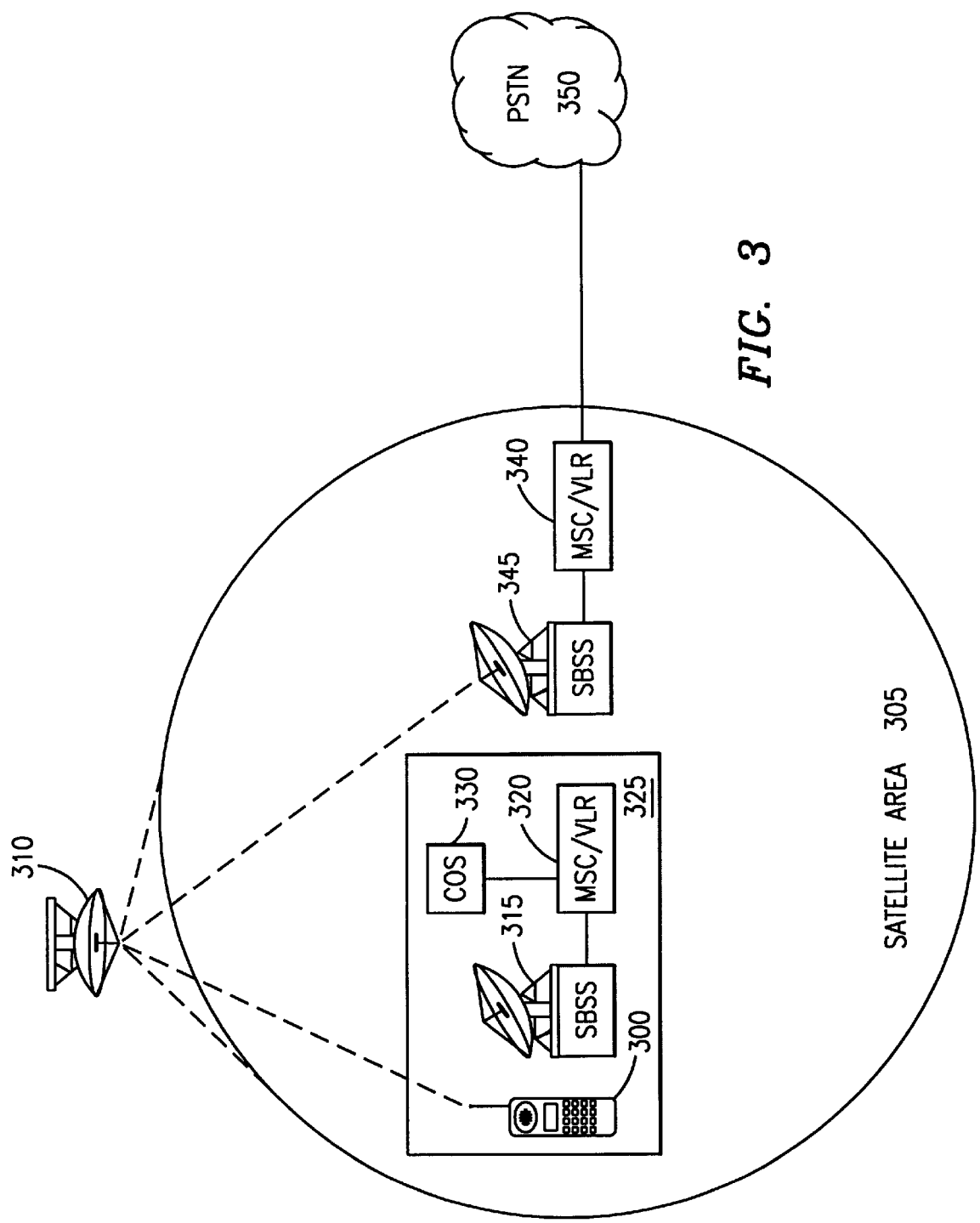
FIG. 3 is a block diagram illustrating call optimization for a mobile originated call to a subscriber within the Public Switched Telephone Network.

With reference now to FIG. 3 of the drawings, one example of call optimization within a satellite network is the optimization of a call from a mobile subscriber to a subscriber within the Public Switched Telephone Network (PSTN) 350 (wireline network). This can be accomplished by moving the mobile subscriber's registration to an optimum MSC/VLR 340. When a Mobile Station (MS) 300 within an area 305 visible to a satellite 310 initiates a call to a subscriber within the Public Switched Telephone Network (PSTN) 350, a Mobile Switching Center/Visitor Location Register (MSC/VLR) 320 serving the area 325 that the MS 300 is located in analyzes the Called Party Number (CPN) and determines that the CPN is not a number registered within the serving MSC/VLR 320. The serving MSC/VLR then sends the CPN, using, for example, an Unstructured Supplementary Services Data (USSD) string, to a Call Optimization Server (COS) 330 or optimization node, which can be co-located with the serving MSC/VLR 320. Alternatively, it should be noted that the COS 330 could instead be co-located with a Home Location Register (HLR) (shown in FIG. 1) or an external node (not shown), such as a node within the Intelligent Network. The protocol to the external node could be based on an Intelligent Network (IN), Mobile Application Part (MAP) or other protocol.

The COS 330 then performs a pre-analysis on the CPN to determine that the CPN belongs to the PSTN 350. Thereafter, the COS 330 determines the optimum MSC/VLR 340, e.g., the MSC/VLR 340 within the area 305 visible to the satellite 310 that has the closest connection to the PSTN 350 or the least expensive link to the PSTN 350, and returns the address for this optimum MSC/VLR 340 to the MS 300 via the satellite 310 and the serving MSC/VLR 320 and satellite-adapted Base Station System (SBSS) 315. The MS 300 then registers with the indicated MSC/VLR 340, and sends a SETUP message to the new MSC/VLR 340 via the satellite 310 and the new SBSS 345, as is understood in the art.

The call can then be completed normally using minimal terrestrial circuits and existing satellite resources. Thus, the cost to the subscriber for the call will be reduced. This call optimization process can also be utilized for calls between two MSs within the satellite network and for calls from the PSTN to a satellite MS subscriber.

Figure 4:
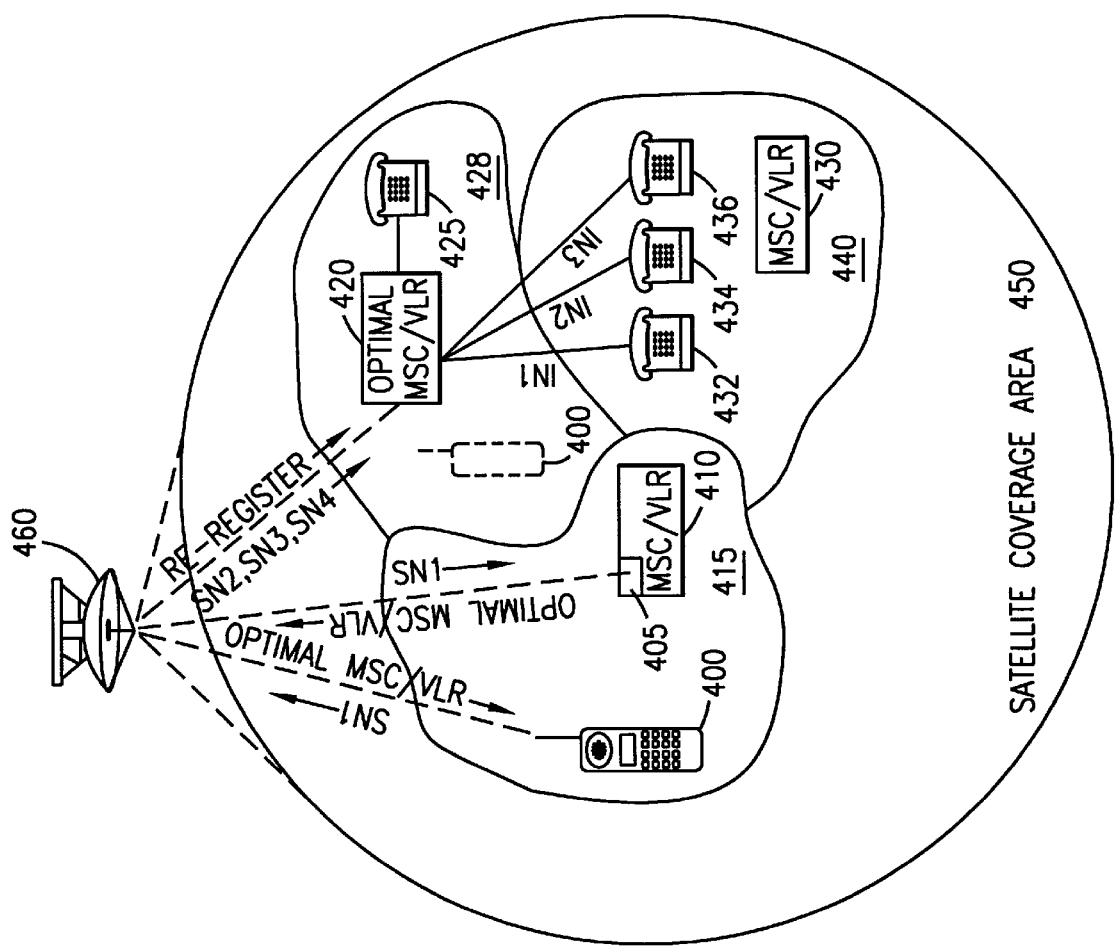
FIG. 4 shows a sub-optimal multi-party call originated by a mobile terminal within a satellite network.

However, such optimization presents a problem if the call is a multi-party call. Normally, as shown in FIG. 4 of the drawings, for multi-party calls, the number which is first called SN1 will determine which MSC/VLR 420 within the satellite coverage area 450 that the MS 400 will be registered in. Either an application 405 within the original MSC/VLR 410 serving the area 415 that the MS 400 is located in or the COS 330, shown in FIG. 3, will determine the optimal MSC/VLR 420 for the first number dialed SN1. The MS 400 then re-registers, via satellite 460, in the optimal MSC/VLR 420, which can then connect the first call SN1 to the first called party 425. All subsequent calls SN2, SN3 and SN4 that are part of the multi-party call will typically be made from that (optimal) MSC/VLR 420.

This presents a problem if, for example, as indicated in FIG. 4 of the drawings, the next three numbers SN2, SN3 and SN4 called are to subscribers 432, 434 and 436 registered in or close to (for PSTN subscribers) a different MSC/VLR 430 than the chosen optimal MSC/VLR 420. As can be seen in FIG. 4, the call configuration for the multi-party call where the calling subscriber 400 is re-registered in the MSC/VLR 420, which serves the area 428 (or is closest to for PSTN calls) for only the first called party 425 is sub-optimal. Ideally, the re-registration should have been to the MSC/VLR 430 serving the area 440 (or close to for PSTN calls) that the last three called party's 432, 434, and 436 are located in, which would have required only one international link (not shown), instead of three international links IN1, IN2 and IN3.

Figure 5:
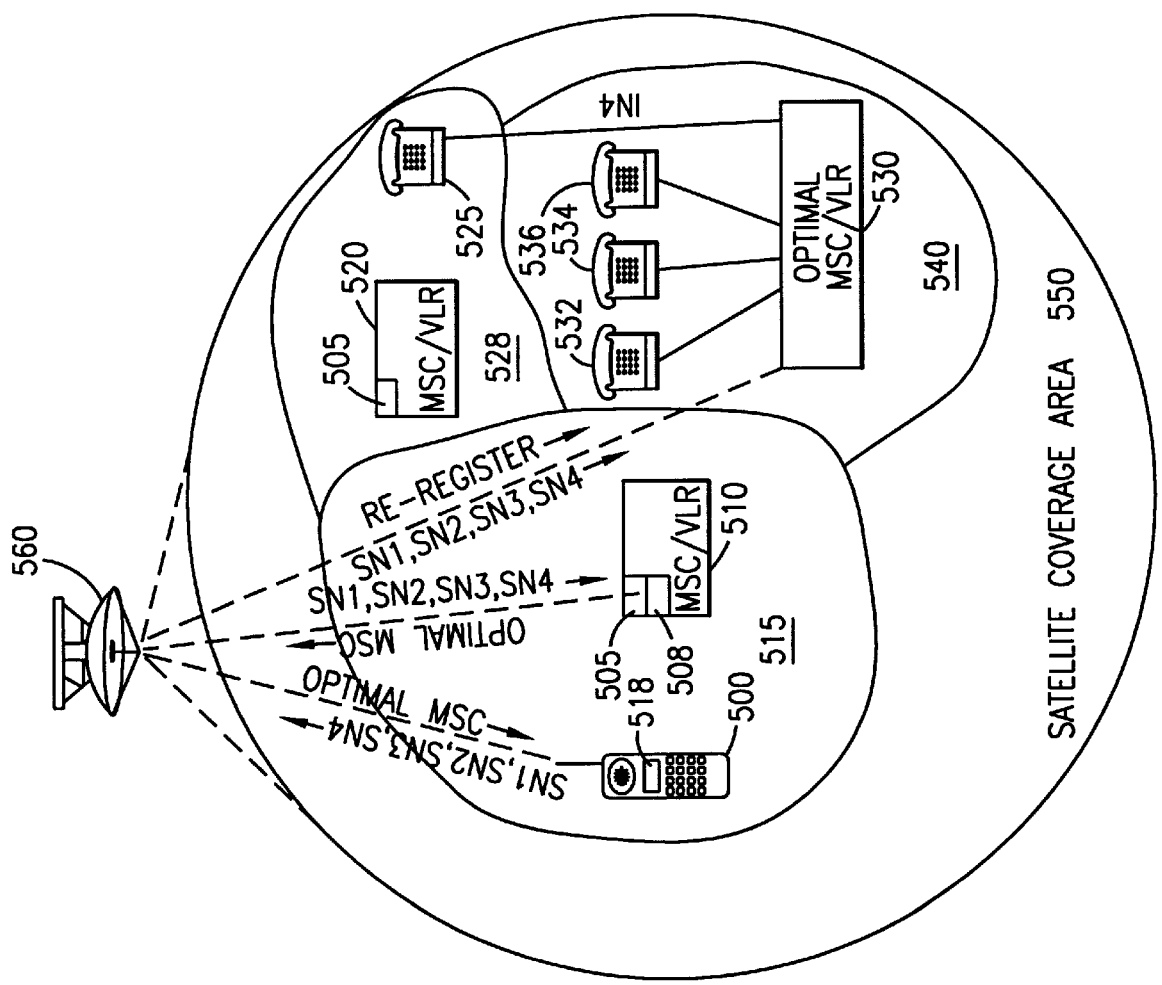
FIG. 5 depicts an optimal multi-party call originated by a mobile terminal within a satellite network.

Therefore, in accordance with a first preferred embodiment of the present invention, as shown in FIG. 5 of the drawings, a subscriber procedure is used to send the entire list of parties SN1, SN2, SN3 and SN4 to the multi-party call to the original MSC/VLR 510 serving the geographical area 515 that the calling MS 500 is located in. Prior to setting up the multi-party call, the mobile subscriber enters a service code, e.g., *99, on the MS 500 to indicate to the serving MSC/VLR 510 that the mobile subscriber would like to set up an optimized multi-party call. Thereafter, the mobile subscriber enters each number SN1, SN2, SN3 and SN4 that will be included in the multi-party call.

The service code triggers an application 505 in the MSC/VLR, which then receives each of the telephone numbers SN1, SN2, SN3 and SN4, and consults a database 508 within the MSC/VLR 510 (or sends the list of telephone numbers to the Call Optimization Server 330, shown in FIG. 3) to determine the most optimal MSC/VLR 530 for the multi-party call. Many different algorithms can be used to determine the optimal MSC/VLR 530 within the satellite coverage are a 550, such as counting the number of different country codes received to determine which country was represented the most often. Alternatively, a link-cost analysis tree could be utilized to determine the least-cost path.

Once the optimal MSC/VLR 530 is determined, the original MSC/VLR 510 informs the MS 500 via the satellite 560 of the identity of the optimal MSC/VLR 530 (in case it is different than the current one). The MS 500 can then re-register with the optimal MSC/VLR 530 and send the same procedure string, including the list of telephone numbers SN1, SN2, SN3 and SN4 to be dialed, without requiring the subscriber to re-enter the telephone numbers SN1, SN2, SN3 and SN4 for the parties to the multi-party call. The optimal MSC/VLR 530 then set-up the multi-party call by establishing a call connection to each party 525, 532, 534, and 536, respectively, using this string.

As an example, in FIG. 5, the optimal MSC/VLR 530 serves the area 540 (or has the closest connection to for PSTN calls) three of the called parties 532, 534 and 536. Thus, for this example, only one international link IN4 is needed to connect the call to subscriber 525, which is within an area 528 served by a different MSC/VLR 520. If the original MSC/VLR 500 is the optimal MSC/VLR 530, then re-registration is not necessary and the multi-party call setup can continue immediately.

In a second embodiment, after re-registration as described hereinbefore, the MS 500 sends only the first number SN1 to be dialed to the optimal MSC/VLR 530. The optimal MSC/VLR 530 then sets up the call to the first party 525. Thereafter, the subscriber must then set up the remaining calls to subscribers 532, 534, and 536 using conventional methods. For example, the calling subscriber can place the first party 525 on hold, dial the number SN2 for the second party 532, and once the connection is made with the second party 532, can then take the first party 525 off hold, thus creating a three-way call. This process continues until all parties 525, 532, 534 and 536 to the call have been dialed and connected. In many systems, the maximum number of parties to a multi-party call is six.

In a third embodiment, the calling subscriber does not enter a service code prior to entering the first number SN1 of the multi-party call. Instead, the original MSC/VLR 510 takes the first number SN1 entered by the subscriber and optimizes only that call to the MSC/VLR 520 serving the area 528 (or having the closest connection to for PSTN calls) the first party 525 is in, as described hereinbefore. Thereafter, the rest of the multi-party call is set up from that optimal MSC/VLR 520 using conventional methods. However, as discussed hereinbefore, this may produce a sub-optimal multi-party call as a whole. Therefore, after the multi-party call has been set up (or alternatively, at the addition of each new subscriber), the MSC/VLR 520 sends the dialed numbers SN1, SN2, SN3 and SN4 to the COS 330, shown in FIG. 3, or to an application 505 within the MSC/VLR 520 to perform an analysis of the dialed numbers SN1, SN2, SN3 and SN4. Thereafter, the current optimal MSC/VLR 520 informs the MS 500 which party should have been called first in order to have an optimal call. For instance, in the example illustrated in FIG. 5 of the drawings, the optimal call would have resulted from dialing SN2 first. Thus, SN2 would be displayed on the display 518 of the MS 500, after dialing either SN2, SN3, or SN4.

In any case, when the final number SN4 of the multi-party call has been dialed, the subscriber will see the number SN2 on the MS display 518, which if called first, would have resulted in an optimal multi-party call set-up. The current optimal MSC/VLR 520 can send, for example, an Unstructured Supplementary Service Data (USSD) message or Et Short Message Service message, to the MS 500 instructing the MS 500 to produce short tones to attract the attention of the subscriber and to display the number SN2 which would have produced an optimal call. Thereafter, the subscriber can decide whether or not to disconnect the current multi-party call and reconnect beginning with the number SN2 which will produce an optimal multi-party call.

In a final embodiment, after the subscriber enters the service code for optimizing a multi-party call and enters the numbers SN1, SN2, SN3 and SN4 to be dialed on the MS 500, either the COS 330, shown in FIG. 3, or the application 505 in the MSC/VLR 510 performs an analysis to determine the optimal MSC/VLR 530 and returns to the subscriber the number SN2 which should be called first. Thereafter, the subscriber can dial the optimal number SN2 returned by the original MSC/VLR 510, which then optimizes the call to the first optimal party 532 by instructing the MS 500 to re-register with the optimal MSC/VLR 530. Once the call has been set-up to the first optimal party 532, the subscriber can set-up the rest of the multi-party call, using conventional methods.

As will be recognized by those skilled in the art, the innovative concepts described in the present application can be modified and varied over a wide range of applications. Accordingly, the scope of patented subject matter should not be limited to any of the specific exemplary teachings discussed.

For example, it should be noted that the aforementioned multi-party call optimization system and method can be utilized in any geostationary satellite system.

What is claimed is:

1. A telecommunications system for optimizing a call between a given one of a plurality of mobile terminals within a satellite network and at least two called subscribers, each said called subscriber having a number associated therewith, said telecommunications system comprising:

an original mobile switching center in communication with said given mobile terminal via a satellite, said original mobile switching center receiving a service code from said given mobile terminal via said satellite, said service code triggering receiving means within said original mobile switching center for receiving each said number associated with each said called subscriber from said given mobile terminal;

an optimal mobile switching center in communication with said given mobile terminal via said satellite, said given mobile terminal registering with said optimal mobile switching center, said optimal mobile switching center connecting said call between said given mobile terminal and said at least two subscribers; and determining means for determining said optimal mobile switching center based on each said number associated with each said called subscriber.

2. The telecommunications system of claim 1, wherein said determining means are located within said original mobile switching center.

3. The telecommunications system of claim 1, wherein said optimal mobile switching center is said original mobile switching center.

4. The telecommunications system of claim 1, wherein said given mobile terminal sends said service code and each said number associated with each said called subscriber to said optimal mobile switching center when said given mobile terminal registers with said optimal mobile switching center, said optimal mobile switching center connecting said call between said given mobile terminal and each said called subscriber using each said number associated with each said called subscriber.

5. The telecommunications system of claim 1, wherein said given mobile terminal sends a first one of said numbers associated with a first one of said called subscribers to said optimal mobile switching center when said given mobile terminal registers with said optimal mobile switching center, said optimal mobile switching center connecting said call between said given mobile terminal and said first called subscriber.

6. The telecommunications system of claim 5, wherein at least one additional one of said numbers is entered on said given mobile terminal, each said additional number being associated with an additional one of said called subscribers not connected with said given mobile terminal, said at least one additional number being sent from said given mobile terminal to said optimal mobile switching center, said optimal mobile switching center connecting said call between said given mobile terminal and said at least one additional called subscriber.

7. The telecommunications system of claim 1, wherein said original mobile switching center sends a first one of said numbers associated with a first one of said called subscribers to said given mobile terminal, said first number being associated with said optimal mobile switching center, said given mobile terminal dialing said first number, said original mobile switching center instructing said given mobile terminal to re-register with said optimal mobile switching center via said satellite based on said first number, said optimal mobile switching center connecting said call between said given mobile terminal and said first called subscriber.

8. The telecommunications system of claim 7, wherein at least one additional one of said numbers is entered on said given mobile terminal, each said additional number being associated with an additional one of said called subscribers not connected with said given mobile terminal, said at least one additional number being sent from said given mobile terminal to said optimal mobile switching center, said optimal mobile switching center connecting said call between said given mobile terminal and said at least one additional called subscriber.

9. The telecommunications system of claim 1, wherein said determining means comprises an optimization node connected to said original mobile switching center.

10. The telecommunications system of claim 1, wherein said optimal mobile switching center has the least cost connection to said called subscribers.

11. The telecommunications system of claim 1, wherein said original mobile switching center and said optimal mobile switching center are within said satellite network.

12. A telecommunications system for optimizing a call between a given one of a plurality of mobile terminals within a satellite network and at least two called subscribers, each said called subscriber having a number associated therewith, said telecommunications system comprising:

an original mobile switching center in communication with said given mobile terminal via a satellite, said original mobile switching center receiving at least said number associated with a given one of said called subscribers from said given mobile terminal;

an additional mobile switching center in communication with said given mobile terminal via said satellite, said original mobile switching center instructing said given mobile terminal to re-register with said additional mobile switching center, said additional mobile switching center connecting said call between said given mobile terminal and said given called subscriber, said additional mobile switching center further receiving at least one additional one of said numbers associated with at least one additional one of said called subscribers not connected with said given mobile terminal from said given mobile terminal; and an optimal mobile switching center in communication with said given mobile terminal via said satellite, said additional mobile switching center instructing given mobile terminal to re-register with said optimal mobile switching center, said optimal mobile switching center connecting said call between said given mobile terminal, said given called subscriber and said at least one additional called subscriber; and determining means for determining said additional mobile switching center based on said number associated with said given called subscriber and for determining said optimal mobile switching center based cn said number associated with said given called subscriber and said at least one additional number.

13. The telecommunications system of claim 12, wherein said determining means are located within said additional mobile switching center.

14. The telecommunications system of claim 12, wherein said additional mobile switching center sends an optimal one of said additional numbers to said given mobile terminal, said optimal additional number being associated with said optimal mobile switching center.

15. The telecommunications system of claim 14, wherein said given mobile terminal disconnects said call to said given called subscriber and sends said optimal additional number to said original mobile switching center, said original mobile switching center instructing said given mobile terminal to re-register with said optimal mobile switching center based on said optimal additional number, said optimal mobile switching center connecting said call between said given mobile terminal and said called subscribers.

16. The telecommunications system of claim 14, wherein said optimal additional number is displayed on a display on said given mobile terminal.

17. The telecommunications system of claim 12, wherein said additional mobile switching center is said optimal mobile switching center.

18. The telecommunications system of claim 12, wherein said determining means comprises an optimization node connected to said original mobile switching center.

19. The telecommunications system of claim 12, wherein said optimal mobile switching center has the least cost connection to said called subscribers.

20. The telecommunications system of claim 12, wherein said original mobile switching center and said optimal mobile switching center are within said satellite network.

21. A method for optimizing a call between a given one of a plurality of mobile terminals within a satellite network and at least two called subscribers, each said called subscriber having a number associated therewith, said method comprising the steps of:

sending, by said given mobile terminal, a service code to an original mobile switching center in communication with said given mobile switching center via said satellite;

receiving, by said original mobile switching center, each said number associated with each said called subscriber from said given mobile terminal;

determining an optimal mobile switching center for said call based on each said number associated with each said called subscriber;

registering, by said given mobile terminal, with said optimal mobile switching center; and connecting, by said optimal mobile switching center, said call between said given mobile terminal and said at least two subscribers.

22. The method of claim 21, wherein said step of determining is performed by said original mobile switching center.

23. The method of claim 21, wherein said step of registering is performed when said optimal mobile switching center is said original mobile switching center.

24. The method of claim 20, further comprising, after said step of registering, the step of:

sending, by said given mobile terminal said service code and each said number associated with each said called subscriber to said optimal mobile switching center.

25. The method of claim 20, further comprising, after said step of registering, the steps of:

sending, by said given mobile terminal, a first one of said numbers associated with a first one of said called subscribers to said optimal mobile switching center; and connecting, by said optimal mobile switching center, said call between said given mobile terminal and said first called subscriber.

26. The method of claim 25, further comprising, after the step of connecting said call between said given mobile terminal and said first called subscriber, the steps of:

entering, on said given mobile terminal, at least one additional one of said numbers, each said additional number being associated with an additional one of said called subscribers not connected with said given mobile terminal; and sending, by said given mobile terminal, said at least one additional number being sent to said optimal mobile switching center, said optimal mobile switching center connecting said call between said given mobile terminal and said at least one additional called subscriber.

27. The method of claim 20, further comprising, after said step of determining, the steps of:

sending, by said original mobile switching center, a first one of said numbers associated with a first one of said called subscribers to said given mobile terminal, said first number being associated with said optimal mobile switching center; and sending, by said given mobile terminal, said first number to said original mobile switching center, said original mobile switching center instructing said given mobile terminal to re-register with said optimal mobile switching center via said satellite based on said first number, said optimal mobile switching center connecting said call between said given mobile terminal and said first called subscriber.

28. The method of claim 27, further comprising, after said step of sending said first number, the steps of:

entering, on said given mobile terminal, at least one additional one of said numbers, each said additional number being associated with an additional one of said called subscribers not connected with said given mobile terminal; and sending, by said given mobile terminal, said at least one additional number to said optimal mobile switching center, said optimal mobile switching center connecting said call between said given mobile terminal and said at least one additional called subscriber.

29. The method of claim 21, wherein said step of determining is performed by an optimization node connected to said original mobile switching center.

30. The method of claim 21, wherein said optimal mobile switching center has the least cost connection to said called subscribers.

31. The method of claim 21, wherein said original mobile switching center and said optimal mobile switching center are within said satellite network.

32. A method for optimizing a call between a given one of a plurality of mobile terminals within a satellite network and at least two called subscribers, each said, called subscriber having a number associated therewith, said method comprising the steps of:

receiving, by an original mobile switching center in communication with said given mobile terminal via a satellite, at least said number associated with a given one of said called subscribers from said given mobile terminal;

determining an additional mobile switching center for said call based on said number associated with said given called subscriber;

instructing, by said original mobile switching center, said given mobile terminal to re-register with said additional mobile switching center via said satellite, said additional mobile switching center connecting said call between said given mobile terminal and said given called subscriber;

receiving, by said additional mobile switching center, at least one additional one of said numbers associated with at least one additional one of said called subscribers not connected with said given mobile terminal from said given mobile terminal;

determining an optimal mobile switching center for said call based on said number associated with said given called subscriber and said at least one additional number;

registering, by said given mobile terminal, with said optimal mobile switching center; and connecting, by said optimal mobile switching center, said call between said given mobile terminal and said at least two subscribers.

33. The method of claim 32, wherein said second step of determining is performed by said additional mobile switching center.

34. The method of claim 32, further comprising, after said step of determining said optimal mobile switching center, the step of:

sending, by said additional mobile switching center, an optimal one of said additional numbers to said given mobile terminal, said optimal additional number being associated with said optimal mobile switching center.

35. The method of claim 34, further comprising, after said step of sending said optimal additional number, the steps of:

disconnecting, by said given mobile terminal, said call to said given called subscriber, said step of disconnecting re-registering said given mobile terminal with said original mobile terminal;

sending, by said given mobile terminal, said optimal additional number to said original mobile switching center; and instructing, by said original mobile switching center, said given mobile terminal to re-register with said optimal mobile switching center based on said optimal additional number, said optimal mobile switching center connecting said call between said given mobile terminal and said called subscribers.

36. The method of claim 35, wherein said optimal additional number is displayed on a display on said given mobile terminal.

37. The method of claim 32, wherein said additional mobile switching center is said optimal mobile switching center.

38. The method of claim 32, wherein said step of determining is performed by an optimization node connected to said original mobile switching center.

39. The method of claim 32, wherein said optimal mobile switching center has the least cost connection to said called subscribers.

40. The method of claim 32, wherein said original mobile switching center and said optimal mobile switching center are within said satellite network.

* * * * *

UNITED STATES PATENT AND TRADEMARK OFFICE
CERTIFICATE OF CORRECTION

PATENT NO : 6,138,014
DATED : October 24, 2000
INVENTOR(S) : Alperovich, et al.

It is certified that error appears in the above-identified patent and that said Letters Patent are hereby corrected as shown below:

[56] References Cited: U.S. Patent Documents:
5,699,407            12/16/97            Nguyen            379            59

Foreign Patent Documents:
EP 0727 914 A2       08/21/96            EPO

Other Publications:
PCT International Search Report dated 7/7/99

| | |
|---|---|
| Attorney, Agent, or Firm | Replace "Jenkins" With --Jenkens-- |
| Column 2, line 62 | Replace "present:" With --present-- |
| Column 5, line 8 | Replace "are a" With --area-- |
| Column 6, line 9 | Replace "Et" With --a-- |
| Column 8, line 24 | Replace "cn" With --on-- |

UNITED STATES PATENT AND TRADEMARK OFFICE
CERTIFICATE OF CORRECTION

PATENT NO : 6,138,014
DATED : October 24, 2000
INVENTOR(S) : Alperovich, et al.

It is certified that error appears in the above-identified patent and that said Letters Patent are hereby corrected as shown below:

| | |
|---|---|
| Column 8, line 66 | Replace "switching center" With --terminal-- |
| Column 9, line 18 | Replace "20" With --21-- |
| Column 9, line 23 | Replace "20" With --21-- |
| Column 9, line 46 | Replace "20" With --21-- |
| Column 10, line 17 | Replace "said," With --said-- |

Signed and Sealed this

Twenty-second Day of May, 2001

Attest:

NICHOLAS P. GODICI

Attesting Officer

Acting Director of the United States Patent and Trademark Office